US008439810B2

(12) United States Patent
Baudhuin

(10) Patent No.: US 8,439,810 B2
(45) Date of Patent: May 14, 2013

(54) ADJUSTABLE MOUNTING DEVICE FOR EXERCISE EQUIPMENT

(75) Inventor: John R. Baudhuin, Santa Monica, CA (US)

(73) Assignee: Mad Dogg Athletics, Inc., Venice, CA (US)

( * ) Notice: Subject to any disclaimer, the term of this patent is extended or adjusted under 35 U.S.C. 154(b) by 0 days.

(21) Appl. No.: 11/652,806

(22) Filed: Jan. 12, 2007

(65) Prior Publication Data

US 2008/0171643 A1 Jul. 17, 2008

(51) Int. Cl.
*A63B 21/00* (2006.01)
(52) U.S. Cl.
USPC .............................. 482/92; 482/908
(58) Field of Classification Search ...... 482/23, 482/24, 43, 69, 70, 91–94, 98–103, 129; 254/390, 409; D8/360; 403/109.2, 109.3, 403/322.2, 379.5, DIG. 4, DIG. 6
See application file for complete search history.

(56) References Cited

U.S. PATENT DOCUMENTS

| 2,716,027 | A | * | 8/1955 | Gehri | 482/131 |
| 3,486,206 | A | * | 12/1969 | McCarthy | 294/82.23 |
| 4,635,934 | A | | 1/1987 | Roethke | |
| 5,417,634 | A | * | 5/1995 | Habing | 482/99 |
| 5,725,200 | A | * | 3/1998 | Gordon | 254/398 |
| 5,735,773 | A | | 4/1998 | Vittone et al. | |
| 5,842,961 | A | | 12/1998 | Davis | |
| 5,967,944 | A | | 10/1999 | Vittone et al. | |
| 6,527,683 | B2 | | 3/2003 | Tolles | |
| 6,565,490 | B2 | * | 5/2003 | O'Hearn | 482/102 |
| 6,786,669 | B2 | * | 9/2004 | Tsui et al. | 403/322.2 |
| 7,070,546 | B1 | | 7/2006 | Grasso | |
| 7,104,937 | B2 | | 9/2006 | Arbuckle et al. | |
| 2006/0189462 | A1 | * | 8/2006 | Pearson et al. | 482/142 |

OTHER PUBLICATIONS www.dictionary.com, Sep. 11, 2009, pertinent pages: i. for "around", see http://dictionary.reference.com/browse/around ii. for "through" see http://dictionary.reference.com/browse/through iii. for "couple" see http://dictionary.reference.com/browse/couple.*
The Merriam-Webster Dictionary, Apr. 19, 2010, pertinent pages: i. "traverse", see http://www.merriam-webster.com/dictionary/traverse.*

* cited by examiner

*Primary Examiner* — Oren Ginsberg
(74) *Attorney, Agent, or Firm* — Maceiko IP

(57) ABSTRACT

The invention generally relates to exercise equipment that includes a pulley and cable mechanism. More specifically, the invention relates to an adjustable mounting device for the pulley so that the pulley may be mounted at different locations on the exercise equipment. This provides the user of such exercise equipment with the ability to adjust and readily fine-tune the position of the pulleys for proper biomechanical alignment with the user's body. Such a mounted pulley may be used on Pilates apparatus, weight and strength training equipment or other exercise equipment.

12 Claims, 10 Drawing Sheets

ADJUSTABLE MOUNTING DEVICE FOR EXERCISE EQUIPMENT

FIELD OF THE INVENTION

The invention generally relates to exercise equipment that includes a pulley and cable mechanism. More specifically, the invention relates to an adjustable mounting device for the pulley so that the pulley may be mounted at different locations on the exercise equipment. This provides the user of such exercise equipment with the ability to adjust and readily fine-tune the position of the pulleys for proper biomechanical alignment with the user's body. Such a mounted pulley may be used on Pilates apparatus, weight and strength training equipment or other exercise equipment.

BACKGROUND OF THE INVENTION

Different types of physical fitness routines are increasingly popular, many of which involve exercise equipment including pulley and cable mechanisms. Pilates equipment, weight machines and other types of exercise equipment having pulley and cable mechanisms are increasingly used both at fitness centers and at home.

For fitness centers, it is cost effective for the fitness center to provide exercise machines that may be used by many individuals. Because the individuals using these devices differ in body shape and size, however, it is desirable that these machines be adjustable to avoid the potential discomfort and injury that may result when an exercise device is not properly adjusted so that it is biomechanically aligned for the user's body size and shape. It is also desirable for these machines to provide proper biomechanical alignment so that, for example, the intended muscle group is worked, or the intended muscle is stretched.

For example, a taller user will typically require an exercise device to be adjusted differently than if it were used by a shorter person. And even for a given user, an exercise device will likely need adjustment to accommodate different exercise positions for that given user's body size and shape for best exercise practice and performance.

Where exercise equipment is used at home, an exercise device may also need to accommodate the sizes and shapes of various family members and the different exercises for which the equipment is used. Space constraints may also exist on the fitness center floor or in the home, thereby dictating that only one or a limited number of exercise machines are available. This again increases the need for an exercise device to be adjustable to accommodate multiple individuals.

Despite the need for adjustability, some forms of exercise equipment with pulley and cable mechanisms cannot be adjusted at all because they include pulley mechanisms that are fixedly attached to the exercise equipment in one location. Other forms of exercise equipment do not have multiple locations, such as holes, at which to mount pulleys. Pilates machines are an example of an exercise device that lacks adjustability of its pulley and cable mechanisms. In any event, these forms of exercise equipment do not provide proper biomechanical positioning of the pulley and cable mechanism in relation to users of different shapes and sizes.

Other forms of exercise equipment, such as a lat pull down machine, may include a linear mechanism to slide a pulley along a fixed track to provide some adjustability. However, these mechanisms are costly because they involve numerous parts and are difficult to assemble, they are bulky and heavy, and may only offer a narrow range of adjustable positions. Furthermore, the typical linear sliding mechanism would not be suitable for certain exercise equipment such as Pilates machines.

It is thus an objective of the present invention to provide an adjustable mounting device for a pulley and cable mechanism that may be safely and quickly mounted at different locations on an exercise device. It is also an objective of the present invention that the adjustable device be easy to assemble, relatively inexpensive to manufacture without large, bulky components and easy to use with the exercise equipment. In this manner, the present invention overcomes the shortcomings of current exercise devices by providing proper biomechanical alignment for users of different shapes and sizes and for different types of exercises being performed by a given user.

SUMMARY OF THE INVENTION

According to the present invention, a pulley is coupled to a mounting mechanism such as pop-pin, snap, bolt or hook. The pulley may be coupled to the mounting device in a fixed or swiveling manner. The mounting mechanism may be removably mounted at different locations on the exercise equipment frame or other component of the equipment which may be suitable for mounting the pulley. As such, any number of pulleys may be mounted to the exercise equipment at any given time to serve the respective needs of the users.

To provide increased adjustability, the frame of the exercise equipment that receives the pop-pin or other form of pulley mounting device has multiple holes or means to accept the pulley mounting device. The holes are located so that when the pulley is mounted thereto, proper biomechanical alignment and range of motion is provided between the pulley and users having different shapes and sizes, or between the pulley and a given user performing different exercises.

The pulley accepts a rope, strap or cable that may be connected to a component of the exercise equipment such as the sliding bed in a Pilates reformer, a weight plate in a weight machine, or some other component. The user interfaces with the opposite end of the rope, strap or cable that is inserted through the pulley.

DETAILED DESCRIPTION OF THE PREFERRED EMBODIMENTS

While there are many different embodiments within the scope of the invention, the figures and the following description illustrate preferred embodiments. The present disclosure is an exemplification of the principles of the invention and is not intended to limit the invention to the embodiments illustrated.

Figure 4:
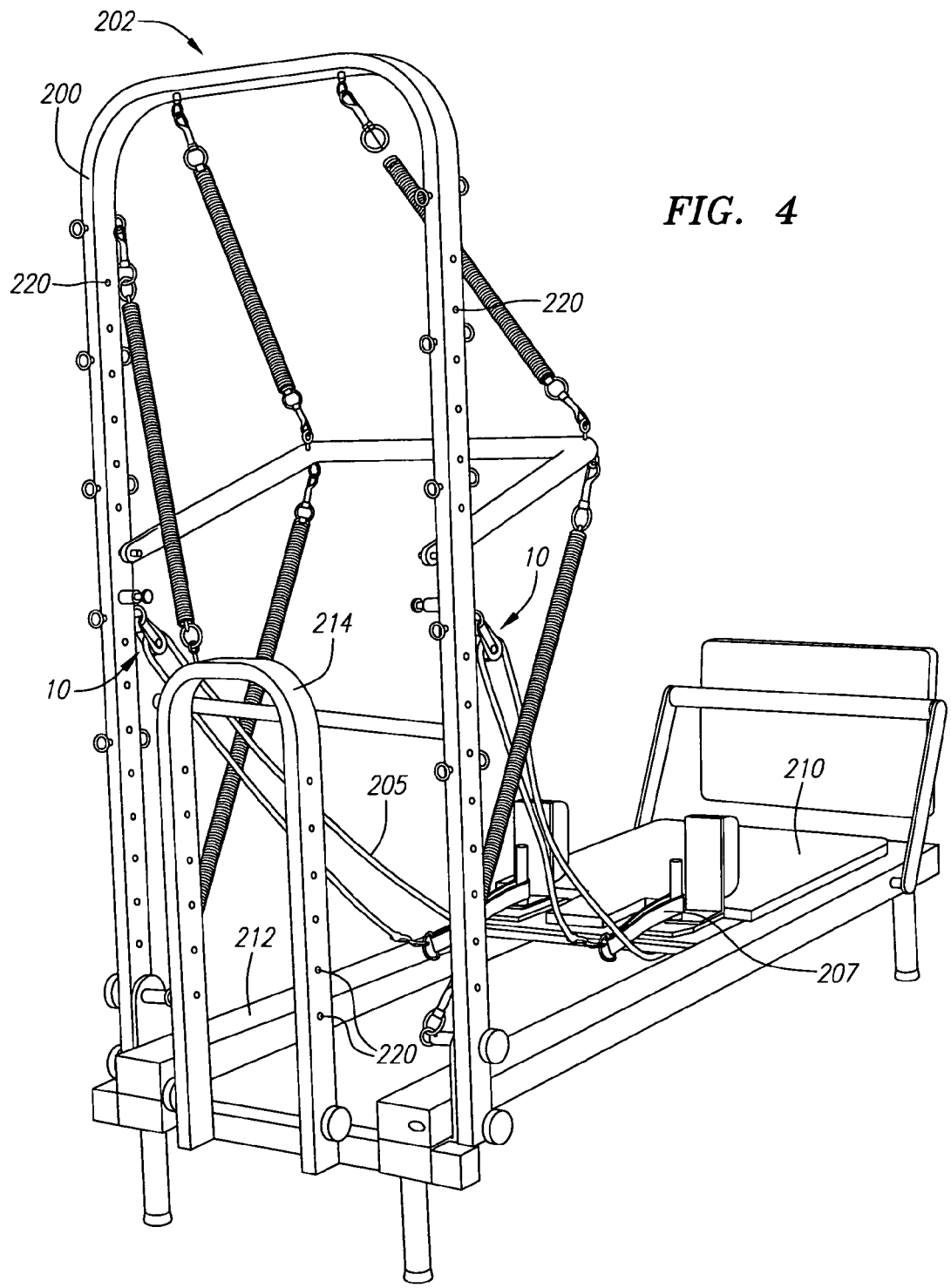
FIG. 4 shows an adjustable pulley mounting device used in connection with Pilates equipment.
Figure 5:
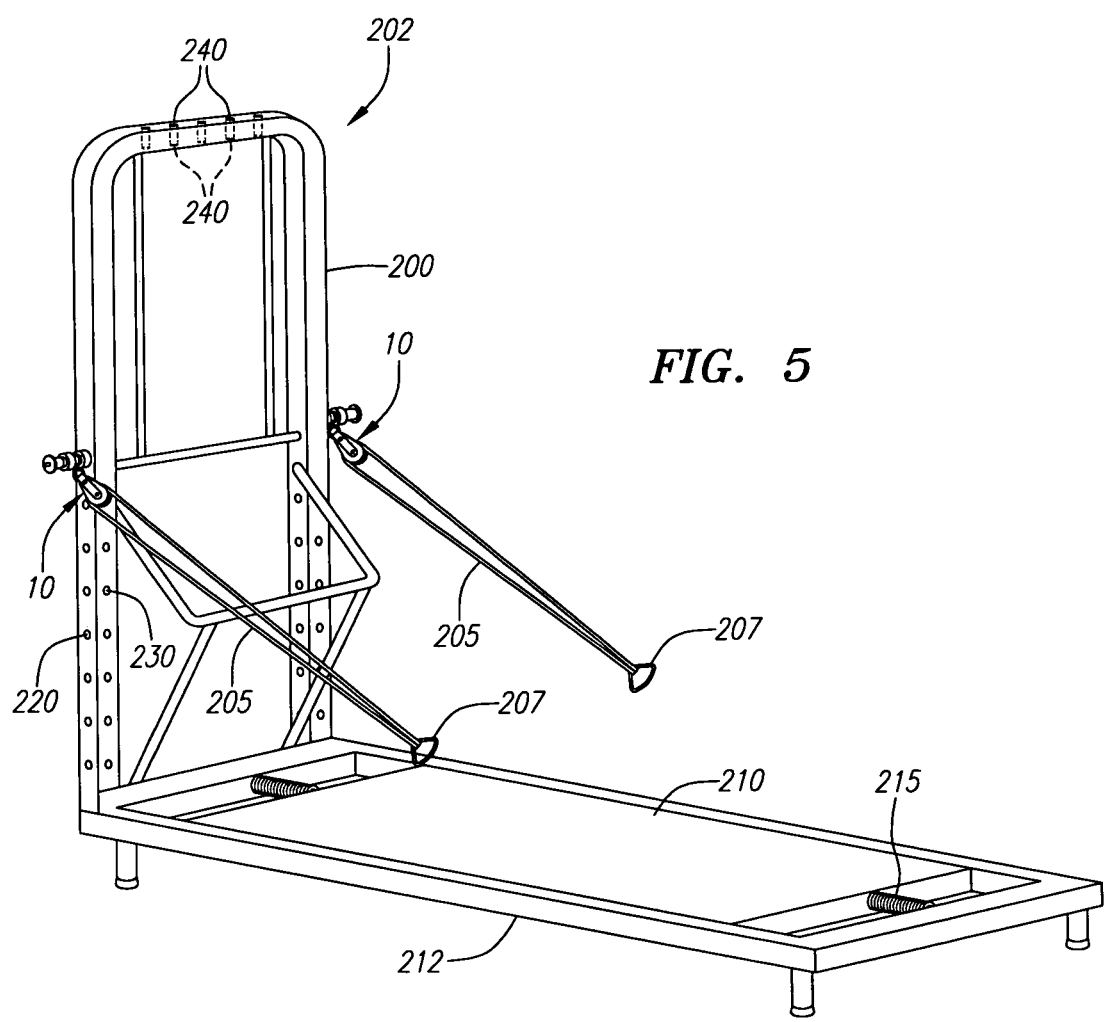
FIG. 5 shows another view of an adjustable pulley mounting device used in connection with Pilates equipment.

The exercise equipment that is suitable for use with the adjustable pulley mounting device of the current invention is not limited to Pilates equipment such as that shown in FIGS. 4 and 5. Instead, the current invention may be used with other forms of exercise apparatus such as weight machines and other exercise equipment where adjustability is desired. For example, not only can the pulley placement in relation to the user's position be fine-tuned, but also the degree and direction of the resistance. Moreover, a larger number of holes increases the user's ability to fine-tune the equipment and achieve an optimal position for best performance.

With reference to FIGS. 1-5, an adjustable mounting device (FIGS. 1-3) that may be mounted in a plurality of locations on the exercise equipment such as that shown in FIG. 5 is now described.

Figure 1:
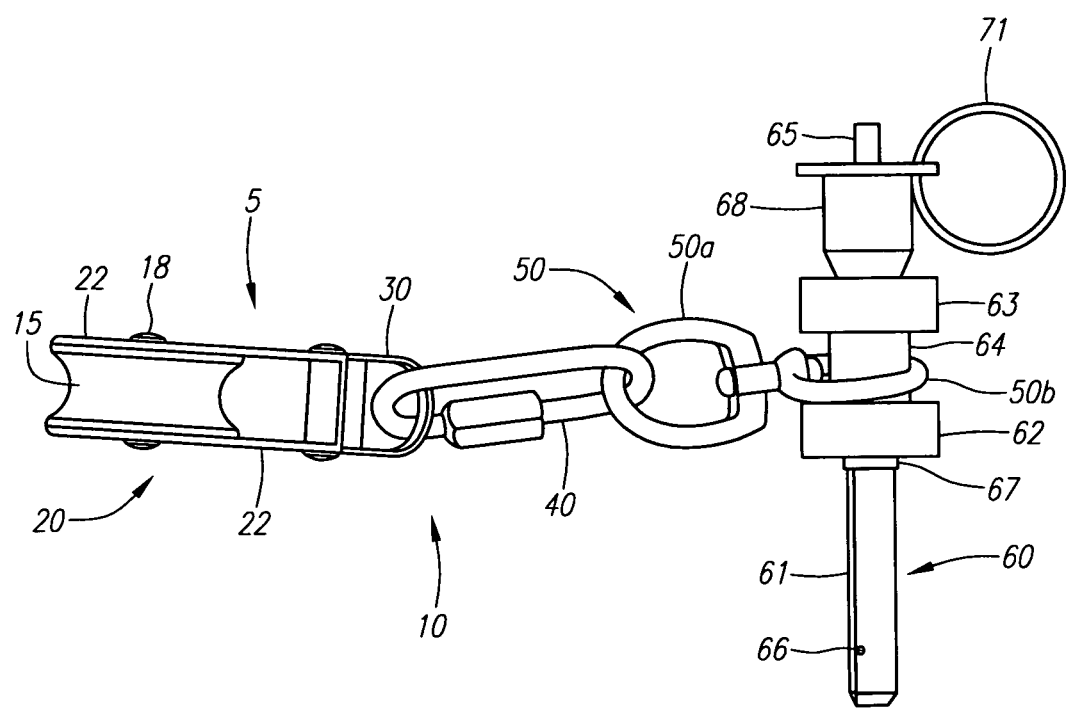
FIG. 1 shows an adjustable pulley mounting device including a pop-pin.
Figure 2:
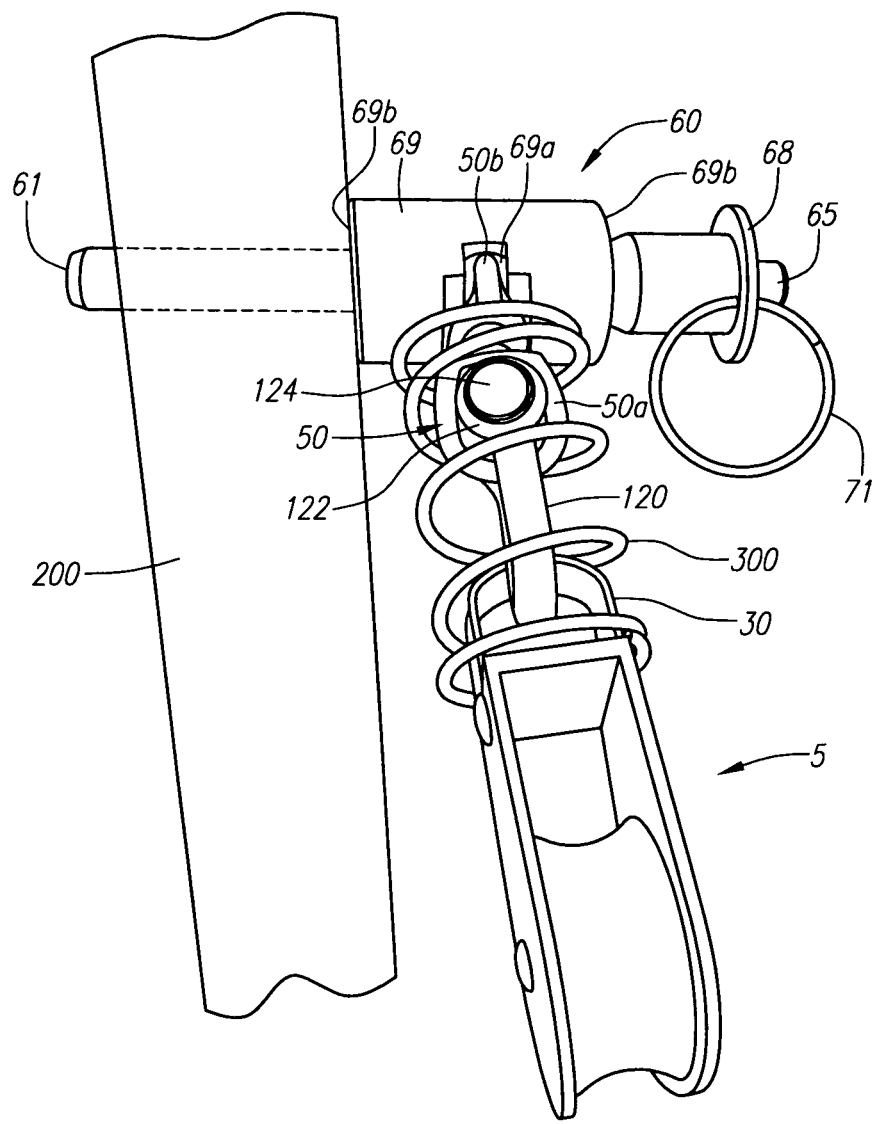
FIG. 2 shows an alternative adjustable pulley mounting device that includes a pop-pin and a coil, and that is mounted to a frame of exercise equipment.
Figure 3:
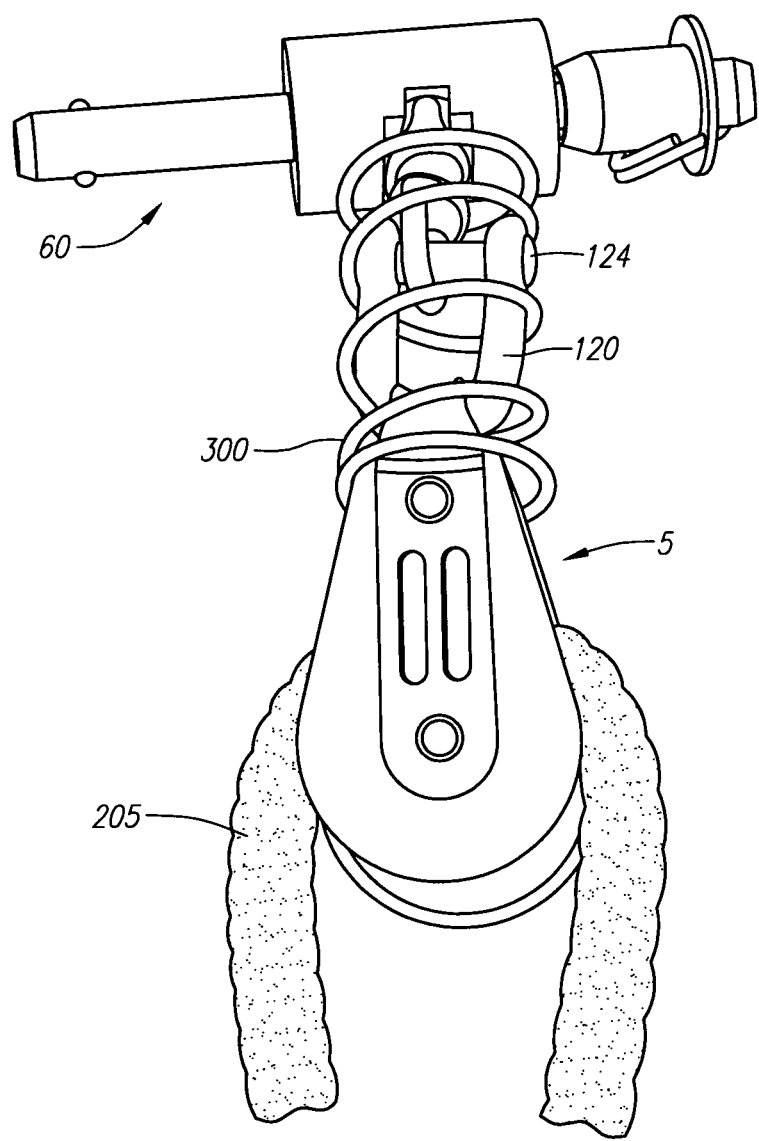
FIG. 3 shows the adjustable pulley mounting device of FIG. 2 from another angle.

As shown in FIGS. 1-3, an embodiment of the adjustable mounting device 10 of the current invention may generally comprise a pulley device 5 coupled to a mounting device such as a pop-pin 60. The pop-pin 60 may be inserted and removed from any number of holes drilled into the frame of the exercise equipment (such as holes 220 or 230 shown in FIGS. 4 and/or 5) to allow users to quickly position the pulley according to their shape and size, as well as the exercise they are performing.

With reference to FIG. 1, the pulley device 5 may comprise a pulley 15 rotatably mounted on a pulley axle 18 extending between the side walls 22 of a U-shaped pulley housing 20. U-shaped fastener 30 is preferably secured to pulley housing 20, forming a closed loop which may accept one of a variety of different connecting means to connect the pulley device 5 to the pop-pin 60. One skilled in the art will appreciate that different configuration pulley devices 5 may be used, and the invention is not limited to that shown in FIG. 1.

In FIG. 1, the connector coupling the pulley device 5 to the pop-pin 60 may include a connector 40 that may link the adjustable pulley device 5 to the pop-pin 60 by means of a pin fastener 50. In this aspect of the invention, connector 40 may comprise an oval ring with a threaded closure means, which provides a secure and movable attachment between the components. Also in this aspect of the invention, pin fastener 50 may comprise a double-eye swivel fastener, which includes eyes 50a and 50b, and which has the ability to rotate clockwise or counterclockwise for greater flexibility of movement which may allow more variability in the direction of travel of the cable. This flexibility may also reduce stress on the parts attached. Connector 40 may attach to one of the eyes 50a of pin fastener 50 while pop-pin 60 may attach to the other eye 50b of the pin fastener. One skilled in the art will appreciate that different types of connectors to connect the pulley device 5 and pop-pin 60 may be used, with the connector 40 and double pin fastener 50 being one example. Other examples may consist of more than two connectors, only one connector (FIG. 6), or no connectors between the pulley device 5 and pop-pin 60 (FIG. 13) as described below.

Different types of pop-pins may be used, but in FIGS. 1 and 2, pop-pin 60 may comprise a shaft 61 which preferably fits snugly in holes drilled into the frame of the exercise apparatus, such as holes 220, 230 or 240, but still can be readily removed. The holes may be chamfered to facilitate inserting pop-pin 60. To this end, pin 60 may include a lock and release mechanism. To insert pin 60 into a hole in the frame (or other component of the exercise equipment to which the pulley is mounted), the user pushes button 65 on pop-pin head 68 for ball bearings 66 to retract within the circumference of shaft 61. Once pin 60 is inserted through the frame, the user may release button 65 to extend ball bearings 66 past the edge of shaft 61 and lock pop-pin 60 securely in place. A ring 71 may be attached to the pop-pin 60 to help the user remove the pin 60 from the frame 200. And because the device 10 may be completely removed from the frame 200, ring 71 may be used to hang device 10 when not inserted into a frame hole.

As mentioned above, pop-pin 60 may traverse through the other eye 50b of pin fastener 50. In FIG. 1, a set of two barrier wheels 62, 63 and one middle wheel 64 may be rotatably mounted on pin 60 between the pop-pin head 68 and ring 67. Wheels 62, 63, 64 may engage the connecting means used to couple the pulley device 5 and pop-pin 60 so as to preferably maintain the axial position of the connecting means along the shaft 61.

A ring 67 is preferably located on the shaft 61 of pin 60 below barrier wheel 62 to keep all the wheels mounted on pin 60 from sliding along the shaft 61 while still allowing for their free rotation. Alternatively, ring 67 may comprise a ridge that is a contiguous part of shaft 61. Ring 67 may be manufactured from a variety of materials, including epoxy, plastic, metal, or the material used for pin 61, or any combination thereof. Although in the present embodiment, ring 67 may maintain the axial position of the wheels 62, 63, 64, these wheels may also be held in place by a ridge, lip or prongs attached to pin 60.

Barrier wheels 62, 63 and middle wheel 64 may be constructed from a durable material, such as plastic. The wheels 62, 63, 64 may comprise separate components or one contiguous component that preferably rotates about pin shaft 61. The eye 50b of pin fastener 50 may freely revolve with and around middle wheel 64 and is kept in place by barrier wheels 62, 63. This arrangement provides for maximum rotation flexibility of the pin fastener 50 and reduces wear on the pop-pin 60.

Alternatively, as shown in FIG. 2, a housing 69 made of a durable material such as metal or hard plastic may be rotatably mounted on pop-pin 60, in place of barrier wheels 62, 63, 64. A cylindrical housing 69 is shown in FIG. 2 though other shapes may be used. Housing 69 also preferably engages the connecting means used to connect the pulley device 5 to the pop-pin 60 to maintain the axial position of the connecting means along shaft 61. A ring 67 or a ridge, lip or prongs attached to pin 60 as described above may be used to retain housing 69 in place and keep it from sliding along the pin.

As shown in FIGS. 2 and 3 and like the wheels 62, 63, 64 in FIG. 1, the housing 69 is mounted on pin 60 such that there is a sufficient length of the pin remaining to be inserted and locked into the holes of the exercise equipment. To this end, the axial length of housing 69 may be such that when the pin 60 is inserted into the frame 200, the ends 69*b* of the cylinder 69 preferably abut the frame 200 and head 68 of the pop-pin 60 so that there is little or no play which facilitates smooth operation. However, it is still preferred that housing 69 not be bound up so that it may have unobstructed rotation around the pin.

The housing 69 includes an opening 69*a* which allows the pin fastener 50 or other connector means to extend through the housing 69 so that shaft 61 may traverse eye 50*b*. It should be noted that the pin fastener 50 of FIG. 2 may be configured differently than the pin fastener 50 of FIG. 1. The opening 69*a* may be created by a relatively inexpensive machine shop process such as drilling into the housing 69. This type of connection may provide a more secure attachment of pulley device 5 and any connector components to pop-pin 60 because the sideways movement of eye 50*b* is limited by the width of the opening 69*a* which may further reduce wear on pin fastener 50. This advantage is equally applicable to any other types of connectors that may be used to attach the pulley to the pop-pin. Another benefit is that eye 50*b* is shielded on all sides except where it is introduced into the opening and it may thus be protected from the accidental contact with other parts of the exercise equipment. Yet another benefit is the overall use of fewer components in device 10 making it less prone to the failure of its parts, easier to assemble and less expensive to manufacture.

As further shown in FIGS. 2 and 3, pulley device 5 may be attached to pin fastener 50 by passing U-shaped bolt 120 through both pulley fastener 30 and eye 50*a*. Bolt 120 has an opening 122 at each end, allowing screw 124 to pass through the bolt openings and securely tighten to close the loop.

A coil spring 300 may be mounted between the pulley device 5 and the pop-pin 60. Spring 300 may be sufficiently compressed when the device 10 is assembled, to provide a bias and push device 5 away from the pin 60. This preferably tends to maintain the components in substantially a straight line without pushing past the pulley or the pin. Use of the spring 300 preferably makes it easier for the user to grab the pulley end and run the cable, strap or rope 205 through it faster. Another benefit is that the spring may prevent the device 10 from hitting or rubbing against the frame 200, protecting both the adjustable device 10 and the exercise equipment. These considerations may become increasingly important where there is a need for frequent adjustment, such as when many users share the same exercise device or the same user performs many types of exercises on the same equipment.

As noted above, it is preferred that the frame 200 of the exercise device 202 (for example, as shown in FIGS. 4 and 5) includes a number of holes or other mounting locations. To this end, exercise device 202 may have several different frame members, such as frame 200 and frame 214, which include holes for a variety of mounting locations. And because device 10 may be removed, the same device 10 may be mounted to different frame members.

As such, since pop-pin 60 may be mounted into any number of holes drilled in the frame of the exercise apparatus, it can easily provide significant adjustability for different size individuals and for different exercises. Additionally, as shown in FIGS. 5*a*-*d* and described below, pop-pin 60 may be mounted sideways through the holes 220, front to back through the holes 230 and vertically through the holes 240, respectively or at the same time. This provides for additional adjustability as discussed later on.

As mentioned above, FIGS. 4 and 5 illustrate one type of exercise equipment with which the adjustable mounting pulley device 10 may be mounted in a plurality of locations. In the example of FIGS. 4 and 5, a Pilates apparatus is shown. This apparatus includes a tower 202 comprising a frame 200, which may have a number of holes 220, 230 and 240 drilled in it. Because of the number of holes in frame 200, the adjustable pulley mounting device 10 may be adjusted to a number of positions. This exemplifies a benefit of the present invention in that significant adjustability is provided at low cost since complex and bulky linear adjustment devices are unnecessary to provide the adjustment.

To this end, the device 10 of the present invention may be preferably completely removed from the frame 200 of exercise equipment 202. Besides providing for ease of adjustment, this removability also allows the device 10 to be manufactured with inexpensive components. This is in sharp contrast to mechanisms that slide along the frame of an exercise machine and that require expensive and bulky components such as collars that must be manufactured to accurately correspond to frame dimensions.

Figure 5A:
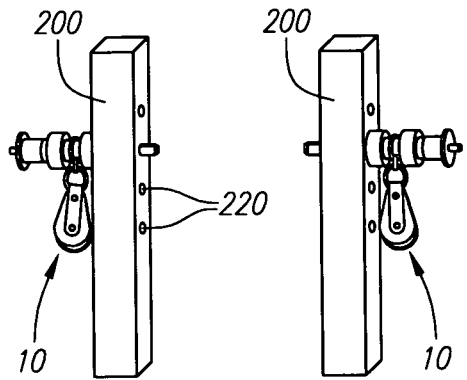
FIG. 5a shows an adjustable pulley mounting device mounted horizontally on the outside of an exercise apparatus frame.

Adjustable mounting pulley devices 10 may be mounted horizontally or vertically into any of the holes provided, as shown in FIGS. 5*a*-*d*, allowing the user to change the distance between the pulleys which in turn allows proper biomechanical alignment for different users. For example, in certain exercises it may be preferred that the distance between the pulley and cables passing therethrough approximates the shoulder width of the user. As such, mounting pulley devices 10 may be mounted on the outside of frame 200, as shown in FIG. 5*a* to accommodate users with broader shoulders while the inside mounting position shown in FIG. 5*b* may be used to accommodate users with narrower shoulders. The removability of the device 10 from the frame 200 allows this increased adjustability.

In the case of the Pilates apparatus of FIGS. 4 and 5, a user may kneel or sit on bed 210 and slide in a motion perpendicular to tower 202, along the horizontal frame 212. The user may grab handles 207 of the rope, strap or cable 205 to pull the body toward frame 200 in a bicep curl type of motion, while spring 215 (shown in FIG. 5) pulls bed 210 back, providing the necessary resistance. In this type of exercise, proper biomechanical alignment, i.e., width between pulleys 10 approximates the width of the user's shoulders, is preferred so that the intended bicep muscles are properly targeted. Users having different shoulder widths may achieve proper alignment by mounting the pulleys appropriately.

Figure 5B:
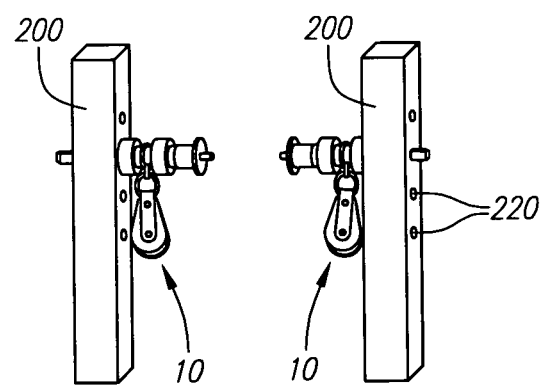
FIG. 5b shows an adjustable pulley mounting device mounted horizontally on the inside of an exercise apparatus frame.

In this same type of exercise, it is also preferred that the pulleys 10 be mounted at a height along the vertical members 220 of frame 200 so that they approximate the distance between the user's elbows and bed 210. So besides the exterior or interior adjustability as shown in FIGS. 5*a* and 5*b*, vertical adjustment is also provided by the present invention. The benefit of adjustability is easily provided due to the ready manner in which the mounting device 10 may be removed from one hole and inserted into another in frame 200.

The present invention provides an advance in exercise equipment such as the Pilates equipment shown in FIGS. 4 and 5 in that typical Pilates equipment lack the ability to adjust the location of the pulleys whatsoever. The present invention provides a simple solution to this problem by offering a quick and easy way to attach the pulleys at the proper levels to maximize the benefits of the work out.

The versatility offered by the present invention is illustrated with further discussion of FIGS. 5a-d. As mentioned above, FIG. 5a shows the adjustable mounting pulley device 10 attached horizontally on the outside of the frame 200, providing a wider width of pulleys for the resistance exercise, while a narrower position can easily be achieved by inserting the adjustable mounting pulley device 10 horizontally in opposite directions on the inner side of the frame 200, as shown in FIG. 5b. When the pulleys 10 are mounted in this manner, the shafts 61 of pop-pins 60 experience torsional forces when the exercise equipment is used. However, shafts 61 may comprise suitably durable materials such as steel, titanium or alloys, to withstand these forces. As such, significant adjustability is provided with devices 10 without the need for complicated and expensive devices such as a linear adjustment device commonly seen on lat pull down machines.

Figure 5C:
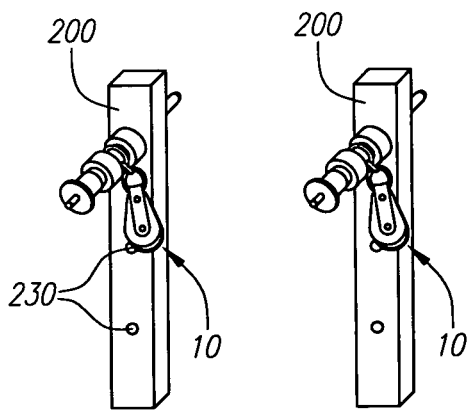
FIG. 5c shows an adjustable pulley mounting device mounted horizontally on an exercise apparatus frame towards the user.

FIG. 5c shows another possible placement from the front of the frame 200 to the back, along the sliding line of the seat. This provides an intermediate location between the outside and inside locations of FIGS. 5a and 5b. This would suit a user having medium shoulder width. The removability of device 10 from the frame provides for this increased adjustability.

Figure 5D:
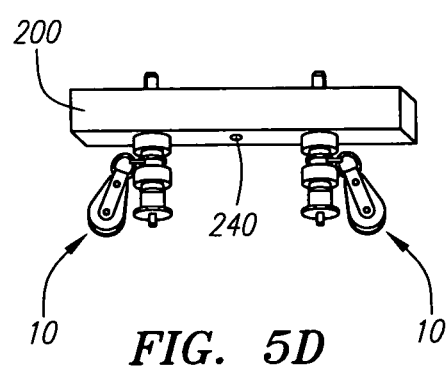
FIG. 5d shows an adjustable pulley mounting device mounted vertically on an exercise apparatus frame.

Other alternatives include attaching the adjustable mounting pulley device 10 vertically through the holes 240, as shown in FIG. 5d, creating the ability to have a high position or a low position depending on the direction that pop-pin 60 is inserted in the pre-drilled holes 240. This could accommodate users of different heights while performing exercises in a standing position.

Part of the novelty of this invention is that it is a low-cost, quick and simple way to achieve various positions on the equipment. Use of drilled holes for adjustment locations reduces manufacturing costs since drilling holes is a relatively simple manufacturing operation and there is no need to have additional components added to the frame 200 such as a plurality of fixed eye-bolts or complex and expensive mechanisms added such as a linear sliding device. Moreover, device 10 is easy to assemble, an operation that may even be done by fitness center staff. And as noted above, the removability of device 10 from frame 200 avoids the need for expensive, bulky components like collars used with mechanisms that slide along the frame.

Another benefit is the simplicity offered by the pop-pins, which can be swiftly attached and removed, allowing users to keep up with the requirements of their exercise programs and providing an incentive to properly adjust the equipment to prevent discomfort and injury. This is especially valuable in group settings with an instructor, where the users need to quickly change positions according to the routines. Quick adjustment is also valuable in circuit training wherein a user seeks to perform different exercises with little resting time between each exercise.

Figure 6:
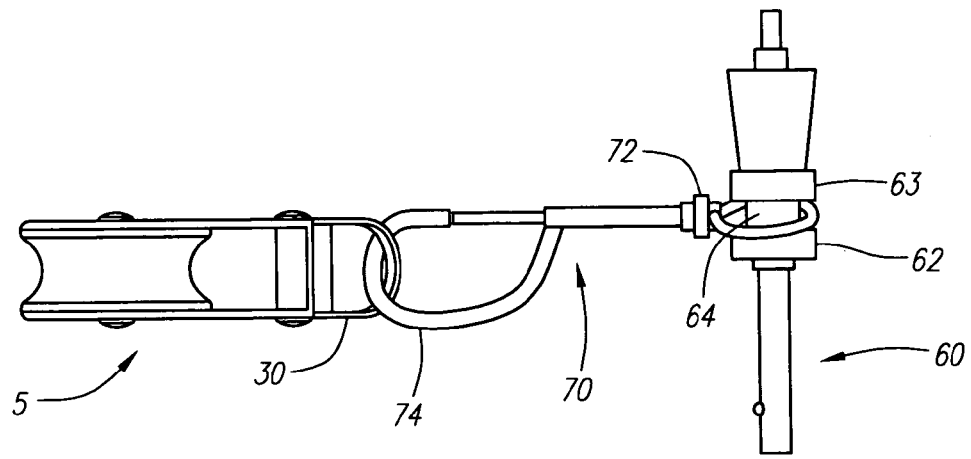
FIG. 6 shows an alternate embodiment of an adjustable pulley mounting device using a pop-pin connected to the pulley device using a swivel eye-bolt snap.

Different embodiments of the adjustable pulley mounting device 10 are now discussed with reference to FIGS. 6-11. In FIG. 6, the pulley device 5 may connect with the pop-pin 60 by means of a swivel eye-bolt snap 70. Pulley fastener 30 may directly attach to the snap head 74, precluding the need to use connector 40. Pop-pin 60 may traverse the swiveling loop 72 of snap 70 as described above for attaching pin fastener 50. Swivel eye-bolt snap 70 can be held in place using the same combination of wheels 62-64 as illustrated in FIG. 1 or the cylindrical housing 69 as shown in FIGS. 2 and 3, allowing for maximum rotation flexibility and reducing wear on the pop-pin 60.

Figure 7:
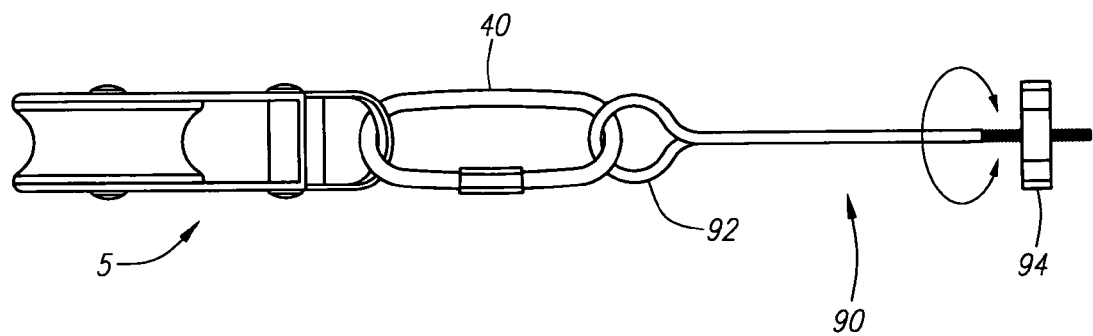
FIG. 7 shows an alternate embodiment of an adjustable pulley mounting device using an eye bolt and nut combination.

In another embodiment of the invention illustrated in FIG. 7, the pulley device 10 may connect with the frame of the exercise apparatus by means of a connector 40 attached to an eye-bolt 90 instead of a pop-pin. The pulley fastener 30 is attached to connector 40 as described above. Connector 40 is attached to the eye 92 of the eye-bolt 90, which the user fastens to the frame of the exercise apparatus by inserting into one of several holes designed for this purpose and securing with nut 94. This embodiment has the advantage that it may be cheaper than the pop-pin alternative. This type of connection also may be desirable when the user wishes to restrict the rotation of the components out of concern for proper exercise performance and/or wear on the equipment.

Figure 8:
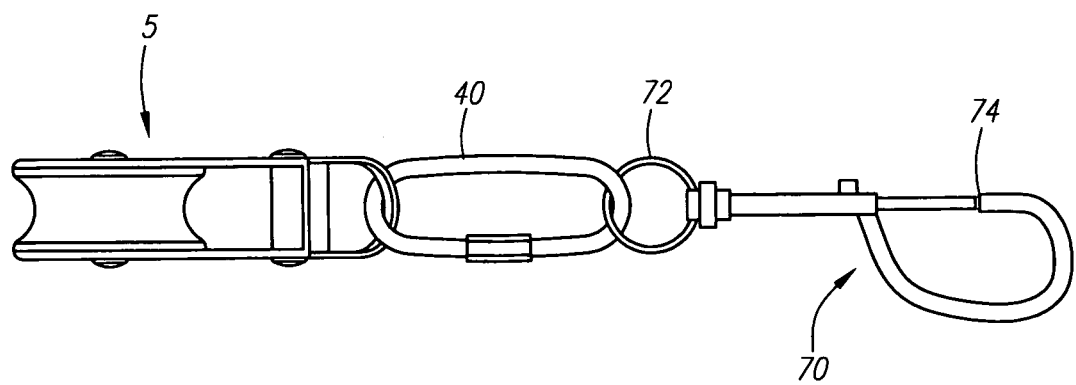
FIG. 8 shows an alternate embodiment of an adjustable pulley mounting device using a swivel eye-bolt snap.

In another embodiment as shown in FIG. 8, the swivel eye-bolt snap 70 may itself be clipped into the holes of the frame 200. As such, the pulley device may be attached to the snap 70 by means of a connector, 40. The pulley fastener 30 may be attached to connector 40 as described above. Connector 40 may be attached to the swiveling loop 72 of snap 70, allowing for the free clockwise or counterclockwise rotation of the components. The user may fasten snap 70 to any one of several holes, loops or hooks specially provided for this purpose on the frame of the exercise apparatus.

Figure 9:
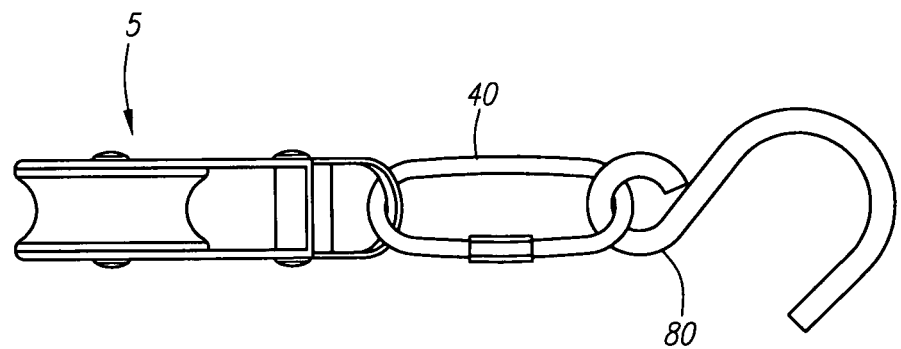
FIG. 9 shows an alternate embodiment of an adjustable pulley mounting device using an S-hook.

In another aspect of the invention shown in FIG. 9, the adjustable mounting pulley device 10 may connect with the exercise apparatus via half-open S-hook 80 instead of swivel eye-bolt snap 70. Pulley device 10 is attached to connector 40 though pulley fastener 30, as described above. Connector 40 passes through the closed end of S-hook 80, securing the connection to the pulley device 10 without the ability to rotate more than a few degrees in any direction. This embodiment of the invention does not allow for the free revolution of the pulley device 10 around the S-hook 80 in response to the same concerns discussed above.

Figure 10:
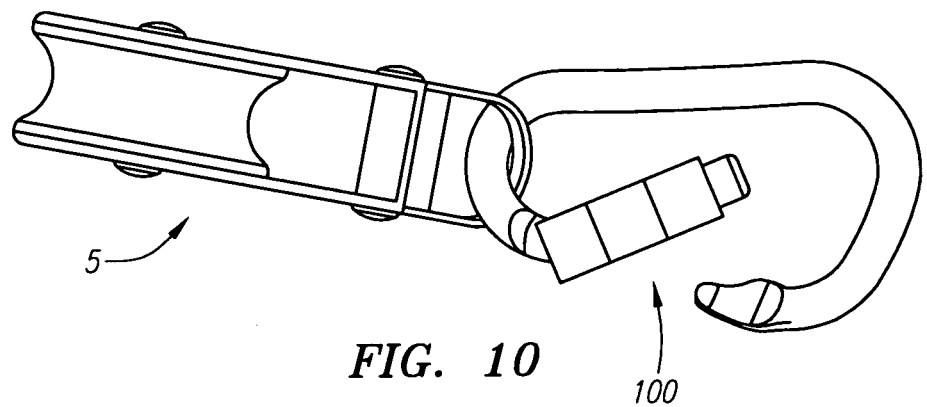
FIG. 10 shows an alternate embodiment of an adjustable pulley mounting device using a carabiner.

In another embodiment of the invention shown in FIG. 10, the pulley device 10 may connect with the frame 200 by means of a carabiner 100. In the same link, carabiner 100 passes through pulley fastener 30 and any one of user selected holes on the exercise equipment frame for this purpose. If desired, the frame 200 may be fitted with hooks or loops onto which carabiner 100 may attach. This embodiment may be preferred where less rotation between the pulley and the exercise apparatus is desired.

Figure 11:
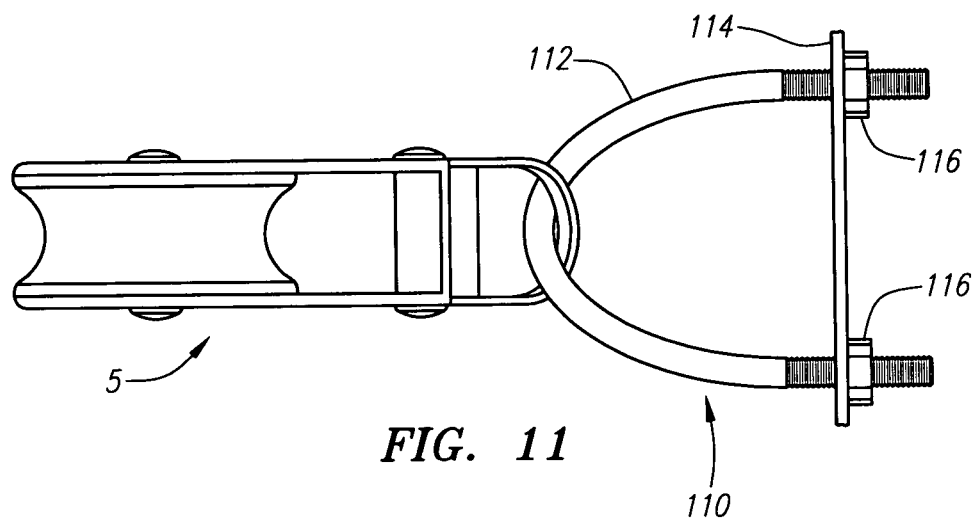
FIG. 11 shows an alternate embodiment of an adjustable pulley mounting device using a u-shaped bolt, plate and nut combination.
Figure 12:
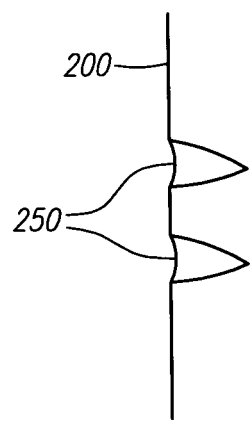
FIG. 12 shows mounting locations comprising grooves on an exercise equipment frame.

The same type of connection can be achieved by replacing carabiner 100 with U-shaped bolt 110 as shown in FIGS. 11 and 12, bypassing the need to use connector 40. In this embodiment, the frame 200 may be equipped with grooves or dents 250 instead of holes. Bracket 112 passes through pulley fastener 30 and wraps around the frame 200. Plate 114 closes the loop and is held in place tightly in one of several groove 250 with nuts 116, allowing for the use of the U-shaped bolt with various frame thicknesses.

Figure 13:
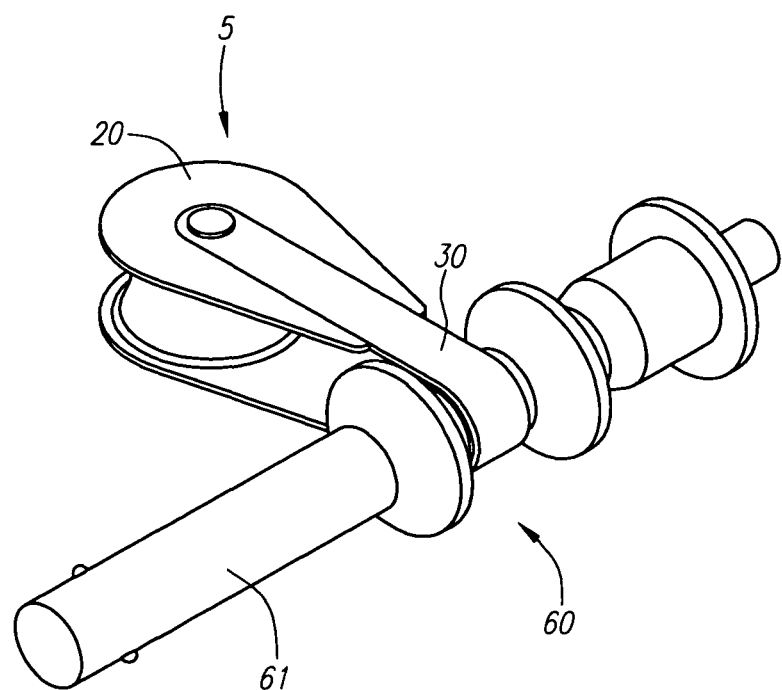
FIG. 13 shows an alternate embodiment of an adjustable pulley mounting device where the pulley is directly coupled to the pop-pin without connectors.

The present invention may also be practiced without the use of any connectors between the pulley device 5 and pop-pin 60, as illustrated in FIG. 13. As described above and shown in FIGS. 1, 2 and 3, pulley device 5 may have pulley fastener 30 extending from housing 20, forming a closed loop that may accept a connector. In this embodiment, however, pop-pin shaft 61 may extend through the closed loop of fastener 30 without using any separate connector components. To this end, it may be preffered that the closed loop may be longer to accommodate shaft 61. This embodiment of the pulley device 10 provides simple assembly and lower cost due to using fewer components.

Other alternatives to the pop-pin 60 may include cotter pins and other mechanisms that may be quickly removed from holes in the frame 200. Such mechanisms may be preferred where, for example, the pulley mounting device 10 is mounted in the configuration of FIG. 5c where additional resistance beyond what may be provided by the ball bearing 66 of pop-pin 60 may provide.

Shaft 61 of pop-pin 60 may also be square or other cross-sectional shape. A square shape, for example, may be desirable when the device 10 is intended for use with exercise equipment which may alrady have pre-existing square holes. The present invention may be practiced with any shape of pin without diminishing adjustability or straightforward assembly of the components.

The present invention may also be practiced whereby existing exercise equipment may simply have holes added to its frame. The device 10 may then be used with these holes, in effect transforming pre-existing exercise equipment with little or no adjustability into modified equipment providing adjustability.

Although certain presently preferred embodiments of the invention have been described herein, it will be apparent to those skilled in the art to which the invention pertains that variations and modifications of the described embodiments may be made without departing from the spirit and scope of the invention.

What is claimed is:

1. An adjustable mounting device for exercise equipment, comprising:
   a pop pin having a shaft;
   a housing mounted on the shaft of the pop-pin;
   a connector having an opening through which the pop-pin extends within the housing; and
   a pulley coupled to the connector wherein the connector allows the pulley to pivot with respect to the exercise equipment.

2. The adjustable mounting device of claim 1, wherein the connector extends around a circumference of the shaft within the housing.

3. The adjustable mounting device of claim 1, wherein the pop pin further comprises a lock and release mechanism.

4. The adjustable mounting device of claim 1, further comprising a coil spring mounted between the pulley and the housing.

5. The adjustable mounting device of claim 1, further comprising:
   a head located near an end of the pop-pin; and
   a ridge included with the shaft of the pop-pin,
   wherein the housing is mounted on the shaft between the ridge and the head.

6. The adjustable mounting device of claim 5 wherein the ridge comprises a ring.

7. The adjustable mounting device of claim 5, wherein the ridge is a contiguous part of the shaft.

8. The adjustable mounting device of claim 1, wherein the adjustable mounting device is completely removable from the exercise equipment to provide adjustability for different exercises.

9. An exercise apparatus, comprising:
   at least one frame with a plurality of mounting holes; and
   at least one adjustable mounting device, comprising:
   a pop pin including a shaft sized to fit within the mounting holes;
   a housing mounted on the shaft of the pop pin;
   a connector having an opening through which the pop-pin extends within the housing; and
   a pulley coupled to the connector wherein the connector allows the pulley to pivot with respect to the exercise apparatus.

10. The exercise apparatus of claim 9, wherein the pop pin is configured for mounting on a side of the at least one frame.

11. The exercise apparatus of claim 9, wherein the at least one adjustable mounting device is completely removable from the exercise apparatus to provide adjustability for different size users.

12. The exercise apparatus of claim 9, wherein the at least one adjustable mounting device is completely removable from the exercise apparatus to provide adjustability for different exercises.

* * * * *